United States Patent
Rietjens

(10) Patent No.: US 6,310,008 B1
(45) Date of Patent: Oct. 30, 2001

(54) CROSS-LINKED WELL TREATING FLUIDS

(75) Inventor: Marcel Rietjens, Delft (NL)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/417,002

(22) Filed: Oct. 12, 1999

(51) Int. Cl.$^7$ .............................. C09K 3/00; E21B 43/26
(52) U.S. Cl. .................... 507/267; 507/268; 507/209; 507/211; 507/271; 507/273; 507/903; 507/922; 166/308
(58) Field of Search .................... 507/209, 271, 507/273, 267, 268, 903, 922, 211; 166/308

(56) References Cited

U.S. PATENT DOCUMENTS

| | | | |
|---|---|---|---|
| 3,888,312 | * 6/1975 | Tiner et al. | 166/308 |
| 4,324,668 | * 4/1982 | Harris | 507/209 |
| 4,464,270 | * 8/1984 | Hollenbeak et al. | 507/922 |
| 4,502,967 | * 3/1985 | Conway | 507/903 |
| 4,514,309 | 4/1985 | Wadhwa | 252/8.55 R |
| 4,579,670 | 4/1986 | Payne | 252/8.55 R |
| 4,619,776 | 10/1986 | Mondshine | 252/8.551 |
| 4,659,811 | * 4/1987 | Wu | 507/209 |
| 4,702,848 | * 10/1987 | Payne | 507/209 |
| 5,082,579 | 1/1992 | Dawson | 252/8.551 |
| 5,145,590 | 9/1992 | Dawson | 252/8.551 |
| 5,160,445 | 11/1992 | Sharif | 252/8.551 |
| 5,224,546 | * 7/1993 | Smith et al. | 507/209 |
| 5,252,236 | 10/1993 | Sharif | 252/8.551 |
| 5,266,224 | 11/1993 | Sharif | 252/8.551 |
| 5,305,832 | * 4/1994 | Gupta et al. | 166/308 |
| 5,310,489 | 5/1994 | Sharif | 252/8.551 |
| 5,486,312 | * 1/1996 | Sandiford et al. | 507/903 |
| 5,759,964 | 6/1998 | Shuchart et al. | 507/209 |
| 5,827,804 | 10/1998 | Harris et al. | 507/273 |

* cited by examiner

*Primary Examiner*—Philip Tucker
(74) *Attorney, Agent, or Firm*—Robert A. Kent; C. Clark Dougherty, Jr.

(57) ABSTRACT

The present invention provides improved cross-linked well treating fluids and methods for preparing and using the fluids in treating wells such as fracturing subterranean zones therein. The improved cross-linked treating fluids comprise water, a galactomannan gelling agent, a cross-linking agent for cross-linking the galactomannan gelling agent, and a viscosity stabilizing agent selected from the group consisting of formaldehyde, formic acid, or mixtures thereof. The viscosity stabilizing agent alters the properties of the well treating fluids and enables them to retain their viscosity over prolonged periods of time when compared to prior well treating fluids.

17 Claims, No Drawings

CROSS-LINKED WELL TREATING FLUIDS

BACKGROUND OF THE INVENTION

1. Field of the Invention

The present invention relates generally to improved cross-linked aqueous well treating fluids and methods for preparing and using such fluids for treating subterranean zones in wells.

2. Description of the Prior Art

High viscosity aqueous cross-linked gels are used in a variety of operations and treatments in oil and gas wells. Such operations and treatments include, but are not limited to, well completion operations, fluid loss control treatments, production stimulation treatments, formation permeability conformance operations, and treatments to reduce water production.

An example of a production stimulation treatment utilizing a high viscosity cross-linked gelled fluid is hydraulic fracturing. In hydraulic fracturing treatments, the high viscosity fluid is utilized as a fracturing fluid and also carries particulate propping agents, e.g., sand, into the fractures formed. That is, the fracturing fluid is pumped through the wellbore into a formation to be stimulated at a rate and pressure such that fractures are formed and extended in the formation. The propping agent is suspended in the fracturing fluid so that it is deposited in the fractures when the gel is broken and returned to the surface. The propping agent functions to prevent the formed fractures from closing whereby conductive channels are formed through which produced fluids can flow to the wellbore.

An example of a well completion operation involving the use of a high viscosity aqueous cross-linked gel is gravel packing. In gravel packing operations, solid gravel particles such as sand are carried to the subterranean zone or formation in which a gravel pack is to be placed by a high viscosity cross-linked gelled fluid. That is, the gravel is suspended in the high viscosity fluid at the surface and carried to the subterranean zone or formation in which the gravel pack is to be placed. Once the gravel is placed in the zone or formation, the cross-linked gel is broken (degraded) and returned to the surface. The gravel pack produced functions as a filter to separate formation solids from produced fluids while permitting the produced fluids to flow into and up the wellbore.

Borate ion has long been used as a cross-linking agent for forming high viscosity cross-linked gelled aqueous well treating fluids. Various sources of borate ion have been utilized including boric acid, borax, sodium tetraborate, slightly water soluble borates such as ulexite, and other proprietary compositions comprising boric acid and dimers and trimers of borate ions. Numerous sources of borate cross-linking solutions are known in the art. U.S. Pat. No. 5,310,489 issued to Sharif on May 10, 1994; U.S. Pat. No. 5,266,224 issued to Sharif on Nov. 30, 1993; U.S. Pat. No. 5,252,236 issued to Sharif on Oct. 12, 1993; and U.S. Pat. No. 5,160,445 issued to Sharif on Nov. 3, 1992, which are incorporated herein by reference, disclose borate cross-linking solutions that may be useful in the present invention.

Polyvalent metal cations have also been used as cross-linking agents to form gelled aqueous well treating fluids. U.S. Pat. No. 5,145,590 issued to Dawson on Sep. 8, 1992, discloses that polyvalent metal cations including aluminum, antimony, zirconium and titanium containing compounds have been used to cross-link polymers used as well treating fluids. U.S. Pat. No. 4,514,309 issued to Wadhwa on Apr. 30, 1985, discloses a cross-linking system based on titanium and boron, including organotitanate compounds.

For well treating fluids to function properly, the fluids must remain viscous until the desired well operation or treatment has been completed. For example, the well treating fluids must remain viscous in a fracture long enough to permit build-up and maintenance of sufficient pressure to open a fracture and the fluid must retain its viscosity as it flows into the fracture to support the propping agents suspended in the fluid. Similarly, the well treating fluids must remain viscous in a gravel packing operation until the gravel is in place. Often, however, prolonged exposure of a well treating fluid to the temperatures encountered in the well causes the fluid to prematurely degrade and lose its viscosity. Many such fluids lose significant viscosity in a few hours at the temperatures experienced downhole, some in the range of from about 150° F. to 400° F., but usually in the range of from about 200° F. to 300° F. Preferably, a well treating fluid should retain its viscosity for up to 8 hours at temperatures of about 200° F. to 300° F.

There is, therefore, a need for improved cross-linked well treating fluids that can retain their viscosity for prolonged periods of time and methods for preparing and using such fluids for treating subterranean zones in wells.

SUMMARY OF THE INVENTION

The present invention provides improved cross-linked gelled aqueous well treating fluids comprising water, a galactomannan gelling agent, a cross-linking agent for cross-linking the galactomannan gelling agent, and a viscosity stabilizing agent selected from the group consisting of formaldehyde, formic acid, or mixtures thereof.

Generally, the galactomannan gelling agents and the cross-linking agents used in the present invention are those known in the art. Typical galactomannan gelling agents include naturally occurring gums and their derivatives and typical cross-linking agents include water soluble borate ion releasing compounds, polyvalent metal cation releasing compounds capable of releasing cations such as magnesium, aluminum, titanium, zirconium, chromium, and antimony, and compositions containing these compounds. A cross-linking composition useful in accordance with the present invention comprises water in an amount of from about 96% to about 5% by weight of the composition and a water soluble cross-linking agent in an amount of from about 4% to about 95% by weight of the composition. The cross-linking composition may also contain an alkanolamine or alkylamine buffer present in an amount of from about 1% to about 13% by weight of the composition. The alkanolamine is preferably an ethanolamine, most preferably monoethanolamine.

The galactomannan gelling agent is present in the treating fluid in an amount of from about 0.06% to about 0.72% by weight of water, the cross-linking agent is present in the treating fluid in an amount of from about 0.01% to about 1% by weight of water, and the viscosity stabilizing agent is present in the treating fluid in an amount of from about 0.001% to about 1% by weight of water.

The methods for using the improved cross-linked well treating fluids of the present invention comprise the steps of preparing a treating fluid of the invention and then introducing the treating fluid into a subterranean zone or formation penetrated by a wellbore.

The methods for preparing the improved cross-linked well treating fluids of the present invention comprise the steps of dissolving a galactomannan gelling agent in water to form a gelled aqueous fluid and then combining a cross-linking agent and a viscosity stabilizing agent of the invention, i.e., formaldehyde, formic acid, or a mixture thereof, with the gelled aqueous fluid.

It is, therefore, an object of the present invention to provide improved cross-linked aqueous well treating fluids that retain their viscosity for prolonged periods of time.

Another object of the present invention is to provide improved methods for treating subterranean zones penetrated by a wellbore.

A further object of the present invention is to provide improved methods for preparing cross-linked aqueous well treating fluids.

Other and further objects, features and advantages of the present invention will be readily apparent to those skilled in the art upon a reading of the description of preferred embodiments which follows.

DESCRIPTION OF PREFERRED EMBODIMENTS

The present invention provides improved cross-linked aqueous well treating fluids comprising water, a galactomannan gelling agent, a cross-linking agent for cross-linking the galactomannan gelling agent, and a viscosity stabilizing agent selected from the group consisting of formaldehyde, formic acid, or mixtures thereof.

The water used to form the well treating fluids includes, but is not limited to, fresh water, salt water, sea water, brine or any other aqueous liquid which does not adversely react with other components of the treating fluid. The water used in well treating fluids normally contains one or more salts for inhibiting the swelling of clays in the subterranean formations or zones being treated or to weight the treating fluid. The most common clay inhibiting salt utilized is potassium chloride, but other salts can also be used. The pH of the water is preferably from about 6.0 to about 8.5 to facilitate the hydration of the galactomannan gelling agent utilized.

The galactomannan gelling agents used to form the well treating fluids include, but are not limited to, the naturally occurring gums and their derivatives, such as guar, locust bean, tara, tamarind, karaya, tragacanth, carrageenan and the like. Most of these gums are characterized as containing a linear backbone consisting of mannose units having various amounts of galactose units attached thereto. The gums can also be characterized as having one or more functional groups such as cis-hydroxyl, hydroxyl, carboxyl, sulfate, sulfonate, amino or amide. Of the various galactomannan gelling agents which can be utilized, one or more gelling agents selected from the group of guar, hydroxyethylguar, hydroxypropylguar, carboxymethylguar, carboxymethylhydroxyethylguar and carboxymethylhydroxypropylguar are preferred. Of these, guar and hydroxypropylguar are the most preferred.

When one or more galactomannan gelling agents are dissolved in water, the gelling agents are hydrated and a viscous aqueous gel is formed. In accordance with the present invention, the galactomannan gelling agent or agents utilized are dissolved in the water in an amount of from about 0.06% to about 0.72% by weight of the water, more preferably in an amount of from about 0.12% to about 0.36%, most preferably about 0.30%.

The cross-linking agents used to form the well treating fluids include, but are not limited to, water soluble borate ion releasing compounds, polyvalent metal cation releasing compounds capable of releasing cations such as magnesium, aluminum, titanium, zirconium, chromium, and antimony, and compositions containing these compounds. Examples of such cross-linking agents include borate ion releasing compounds such as boric acid, boric oxide, pyroboric acid, metaboric acid, borax, sodium tetraborate, ulexite, colemanite, or mixtures thereof and transition metal ion releasing compounds such as titanium dioxide, zirconium oxychloride, zirconium acetylacetonate, titanium citrate, titanium malate, titanium tartrate, zirconium lactate, aluminum acetate, and other aluminum, titanium, zirconium, chromium, and antimony chelates. Preferably, the cross-linking agent used is one that is delayed in cross-linking the gelling agent to permit introduction of the aqueous gel into a well before the gel is cross-linked and the viscosity thereof significantly increased.

The cross-linking agent is preferably present in well treating fluids in an amount of from about 0.01% to about 1% by weight of water in the treating fluids, most preferably in an amount of from about 0.1% to about 0.5%.

Cross-linking compositions can also be used to form the well treating fluids of this invention. Such compositions basically comprise water, a cross-linking agent as described herein, and an optional compound that preserves the composition or enhances its properties.

The water used to form the cross-linking composition is preferably fresh water, but other aqueous liquids can be utilized so long as they do not adversely react with or otherwise affect other components of the cross-linking composition or the treating fluid formed therewith. The compositions can include one or more freezing point depressants such as ethylene glycol, propylene glycol, alcohols or the like to prevent the composition from freezing in cold weather. Preferably, ethylene glycol is combined with the water used in an amount of about 50% by weight of the resulting solution which depresses the freezing point of the cross-linking composition to less than about −20° F. The term "water" when used herein relating to the cross-linking composition means water or other suitable aqueous liquid with or without one or more freezing point depressants dissolved therein.

The water is preferably present in the composition in an amount of from about 96% to about 5% by weight of the composition, most preferably about 60%. The cross-linking agent is preferably present in the cross-linking composition in an amount of from about 4% to about 95% by weight of the composition, most preferably in an amount of about 40%. In a preferred embodiment, a borate ion releasing compound is present as boric acid in an amount of from about 4% to about 95% by weight of the composition, most preferably in an amount of about 40%.

The cross-linking composition can contain additional compounds for enhancing its properties. In one embodiment, the composition further contains a buffering compound selected from the group consisting of alkanolamines or alkylamines. A variety of alkanolamines or alkylamines can be utilized in the cross-linking composition, but the quantity of polyvalent metal cation in the composition may be reduced as the molecular weight of the amine included in the composition increases. Thus, it is preferred that a relatively low molecular weight alkanolamine be used such as an ethanolamine. The most preferred low molecular weight alkanolamine is monoethanolamine. The use of a low molecular weight alkanolamine in the cross-linking composition produces the further benefit of making the composition cold weather stable, i.e., the composition without a freezing point depressant therein does not crystallize or the like at low temperatures down to about 5° F. Other suitable alkanolamines include diethanolamine, 1-amino-2-propanol, 1amino-2-butanol and the like. The alkylamines can comprise an aliphatic polyamine such as, for example, ethylenediamine, diethylenetriamine, triethylenetetraamine, 1,2-diaminopropane, tetraethylenepentamine and the like.

The alkanolamine or alkylamine is generally present in the cross-linking and buffering composition in an amount of from about 1% to about 13% by weight of the composition. When monoethanolamine is utilized, it is preferably present in the composition in an amount of about 10% by weight of the composition.

A cross-linking composition which is particularly useful in the present invention comprises water present in an amount of about 60% by weight of the composition, a borate ion releasing compound such as boric acid, boric oxide, pyroboric acid, metaboric acid, borax, sodium tetraborate, ulexite, colemanite, or mixtures thereof present in an amount of about 30% by weight of the composition, and monoethanolamine present in an amount of about 10% by weight of the composition. This cross-linking composition is preferably present in well treating fluids in an amount of from about 0.05% to about 0.8% by weight of water in the treating fluids, most preferably in an amount of from about 0.15% to about 0.4%. In another preferred embodiment, the cross-linking composition comprises water and about 40% by weight of ulexite.

The cross-linked gel can also include other conventional additives such as pH adjusting and control agents, gel breakers, and the like which do not adversely react with or otherwise affect other components in the well treating fluid.

The viscosity stabilizing agents useful in the present invention are selected from the group consisting of formaldehyde, formic acid, or mixtures thereof, most preferably formic acid. The viscosity stabilizing agent is preferably present in the well treating fluids in an amount of from about 0.001% to about 1% by weight of water in the treating fluids, most preferably from about 0.01% to about 0.5%. When the viscosity stabilizing agent contains formaldehyde, the formaldehyde can be present in the composition or it can be generated in the composition from a precursor such as trioxane or hexamethyltetramine. When the viscosity stabilizing agent contains formic acid, the formic acid can be provided by substantially any of the water soluble formate salts such as sodium formate or potassium formate. The weight percent of formate is calculated as formic acid equivalent when salts are utilized.

A particularly preferred highly viscous borate cross-linked gelled aqueous well treating fluid of the present invention comprises water, guar present in an amount of about 0.30% by weight of the water, a borate ion cross-linking agent present in an amount of about 0.2% by weight of the water, and formic acid present in an amount of about 0.1% by weight of the water.

Another preferred highly viscous borate cross-linked gelled aqueous well treating fluid of the present invention comprises water, guar present in an amount of about 0.30% by weight of the water, a borate cross-linking composition present in an amount of about 0.2% by weight of the water, and formic acid present in an amount of about 0.1% by weight of the water. The borate cross-linking composition preferably comprises about 70% water and about 30% ulexite by weight of the composition or, in a more preferred embodiment, about 60% water, about 30% ulexite, and about 10% monoethanolamine by weight of the composition. In another embodiment, boric acid can be substituted for ulexite.

As will be well understood by those skilled in the art, a variety of conventional additives can be included in the well treating fluids of the present invention such as gel breakers, clay stabilizers, bactericides, fluid loss additives, and the like which do not adversely react with the treating fluids or prevent their use in a desired manner.

The improved methods of the present invention for treating a subterranean zone penetrated by a wellbore comprise the steps of preparing a high viscosity cross-linked gelled aqueous treating fluid of the present invention and then pumping the treating fluid into the subterranean zone. While the improved treating fluids of the present invention can be utilized for performing any of the various well treatments mentioned above, the treating fluids are particularly well suited for performing fracture stimulation treatments. In such treatments, the well treating fluid is pumped through the wellbore into the subterranean zone or formation to be fractured at a high rate and pressure whereby fractures are formed in the subterranean zone or formation and the propping agent, such as sand, suspended in the treating fluid is carried into the fractures and deposited therein. The improved well treating fluids of the present invention remain viscous for extended periods to ensure that the proppant is properly deposited. Thereafter, the treating fluid is caused to break, i.e., revert to a thin fluid which can be reverse flowed out of the fractures leaving the proppant therein.

The methods for preparing the cross-linked gelled aqueous treating fluids of the present invention comprise the steps of dissolving a galactomannan gelling agent in water to form a gelled aqueous fluid and then combining the cross-linking agent and the viscosity stabilizing agent with the gelled aqueous fluid. The galactomannan gelling agent is dissolved in the water utilizing conventional mixing and pumping equipment to form a gelled aqueous fluid, i.e., an aqueous solution of hydrated gelling agent. Thereafter, the liquid cross-linking agent and the viscosity stabilizing agent are combined with the gelled aqueous fluid. As is well understood by those skilled in the art, the cross-linking agent and the viscosity stabilizing agent can be combined with the gelled aqueous fluid on-the-fly. That is, the cross-linking agent and the viscosity stabilizing agent can be pumped and metered into the gelled aqueous fluid as the gelled aqueous fluid is pumped into the wellbore.

The viscosity stabilizing agents of this inventions alter the properties of the well treating fluids and enable the fluids to retain their viscosity over prolonged periods of time at high temperatures as when compared to prior well treating fluids.

In order to further illustrate the compositions and methods of the present invention, the following examples are given.

EXAMPLE 1

A borate cross-linked hydroxy propylguar gel containing a concentration of 30 pounds of polymer per 1000 gallons of water was prepared with a Waring blender. The water used was tap water containing 2% KCl. The hydroxy propylguar was hydrated for about 15 minutes after adjusting the pH to about 5 using acetic acid. Sodium carbonate buffer was added to produce a concentration of 1000 parts per million of the buffer. A borate cross-linking agent comprising 40% ulexite was added to the solution in an amount of 3.4 gallons cross-linking agent per 1000 gallons of solution to produce a cross-linked gel.Various amounts of the viscosity stabilizing agents of this invention were added to 30–40 milliliter samples of the cross-linked gel. The temperature was adjusted to 250° F. and the pH was raised up to 12.0 with caustic. Each sample was placed in a standard Fann-50C R1 cup. The cup was attached to the Fann-50C instrument and an automatic control program was started. The fluid was subjected to a constant shear of 80 sec-1. The viscosity was measured when the test was started and at 10 minute intervals for two hours. Viscosity measurements were discontinued when the viscosity fell below 100 centipoises. After the test, the final pH (pHf) was determined and recorded when the gel was removed from the Fann-50 and cooled. The results of these tests are shown in Table I below.

TABLE I

| Sample | Viscosity Stabilizing Agent Used | Viscosity Stabilizing Agent Concentration %/ppm | Time in Minutes and Viscosity in CentiPoises ||||||||||||
|---|---|---|---|---|---|---|---|---|---|---|---|---|---|---|
| | | | 0 | 10 | 20 | 30 | 40 | 50 | 60 | 70 | 80 | 90 | 100 | 110 | 120 |
| C | None | 0/0 | 470 | 155 | 25 | | | | | | | | | | |
| 1 | Formic Acid | 0.001/10 | 441 | 485 | 166 | 73 | | | | | | | | | |
| 2 | Formic Acid | 0.01/100 | 611 | 487 | 499 | 489 | 419 | 351 | 254 | 180 | 122 | 79 | | | |
| 3 | Formic Acid | 0.1/1000 | 664 | 589 | 643 | 585 | 632 | 541 | 593 | 545 | 508 | 464 | 432 | 367 | 317 |
| 4 | Formaldehyde | 0.0045/45 | 495 | 574 | 565 | 523 | 506 | 465 | 427 | 373 | 340 | 270 | 239 | 204 | 139 |
| 5 | Formaldehyde | 0.045/450 | 636 | 586 | 656 | 632 | 617 | 579 | 568 | 536 | 547 | 515 | 443 | 395 | 335 |
| 6 | Formic Acid & Formaldehyde | 0.005/50 ppm each | 628 | 691 | 636 | 567 | 541 | 529 | 473 | 418 | 360 | 280 | 261 | 247 | 181 |

Referring to Table I, the viscosity of the samples in centiPoise is shown as a function of time. The data show that the viscosity stabilizing agents of the present invention altered the properties of the well treating fluids and enabled the fluids to retain their viscosity over prolonged periods of time when compared to fluids that did not contain the viscosity stabilizing agents. The data also shows that either formic acid, formaldehyde, or a mixture of the compounds enable well treating fluids to retain their viscosity over prolonged periods of time.

EXAMPLE 2

The experimental procedure given for Example 1 was repeated with the viscosity stabilizing agent concentrations shown below. The results are shown in Table II below.

Referring to Table II, the viscosity of the samples in centiPoise is shown as a function of time. The data show that the viscosity stabilizing agents of the present invention altered the properties of the well treating fluids and enabled the fluids to retain their viscosity over prolonged periods of time and show that concentrations of as little as 0.025% formic acid will enabled the fluids to retain their viscosity.

While the preferred embodiments are shown to illustrate the invention, numerous changes to the materials and methods can be made by those skilled in the art. All such changes are encompassed within the spirit of the invention as defined by the appended claims.

TABLE II

| Sample | Viscosity Stabilizing Agent Used | Viscosity Stabilizing Agent Concentration %/ppm | Time in Minutes and Viscosity in CentiPoises ||||||||||||
|---|---|---|---|---|---|---|---|---|---|---|---|---|---|---|
| | | | 0 | 10 | 20 | 30 | 40 | 50 | 60 | 70 | 80 | 90 | 100 | 110 | 120 |
| 1 | Formic Acid | 0.025/250 | 620 | 530 | 525 | 470 | 500 | 445 | 330 | 250 | 210 | 190 | 160 | 120 | 90 |
| 2 | Formic Acid | 0.05/500 | 570 | 620 | 640 | 630 | 590 | 560 | 540 | 525 | 460 | 440 | 415 | 385 | 325 |
| 3 | Formic Acid | 0.1/1000 | 600 | 625 | 660 | 630 | 620 | 615 | 610 | 610 | 625 | 560 | 570 | 570 | 540 |
| 4 | Formic Acid | 0.2/2000 | 490 | 560 | 570 | 560 | 540 | 520 | 570 | 590 | 585 | 590 | 550 | 570 | 590 |

What is claimed is:

1. An improved method for treating a subterranean zone penetrated by a wellbore comprising the steps of:
   preparing an improved cross-linked aqueous well treating fluid comprising:
      water;
      a galactomannan gelling agent;
      a cross-linking agent for cross-linking said galactomannan gelling agent;
      a viscosity stabilizing agent selected from the group consisting of formic acid and mixtures of formaldehyde and formic acid; and
   pumping said treating fluid into said subterranean zone, wherein said formic acid or mixture of formaldehyde and formic acid function to stabilize the viscosity of said fluid.

2. The method of claim 1 wherein said galactomannan gelling agent is selected from the group consisting of guar, hydroxyethylguar, hydroxypropylguar, carboxymethylguar, carboxymethyl hydroxyethylguar, carboxymethylhydroxypropylguar and mixtures thereof.

3. The method of claim 1 wherein said galactomannan gelling agent is selected from the group consisting of guar and hydroxypropylguar.

4. The method of claim 1 wherein said galactomannan gelling agent is present in said treating fluid in an amount of from about 0.06% to about 0.72% by weight of said water.

5. The method of claim 1 wherein said cross-linking agent is selected from the group consisting of borate ion releasing compounds and polyvalent metal cation releasing compounds.

6. The method of claim 5 wherein said borate ion releasing compound is selected from the group consisting of boric acid, boric oxide, pyroboric acid, metaboric acid, borax, sodium tetraborate, ulexite, colemanite, and mixtures thereof.

7. The method of claim 5 wherein said polyvalent metal cation releasing compound is selected from the group consisting of titanium dioxide, zirconium oxychloride, zirconium acetylacetonate, titanium citrate, titanium malate, titanium tartrate, zirconium lactate, and aluminum acetate.

8. The method of claim 1 wherein said cross-linking agent is present in said treating fluid in an amount of from about 0.01% to about 1% by weight of said water.

9. The method of claim 1 wherein said cross-linking agent is a cross-linking composition comprising water and a cross-linking agent selected from the group consisting of borate ion releasing compounds and polyvalent metal cation releasing compounds.

10. The method of claim 9 wherein said cross-linking composition comprises from about 96% to about 5% water by weight of said composition and from about 4% to about 95% borate ion releasing compound or polyvalent metal cation releasing compound by weight of said composition.

11. The method of claim 9 wherein said cross-linking composition further comprises a buffering compound selected from the group consisting of alkanolamines or alkylamines.

12. The method of claim 11 wherein said buffering compound is present in an amount of from about 1% to about 13% by weight of said composition.

13. The method of claim 11 wherein said alkanolamine is ethanolamine.

14. The method of claim 9 wherein said cross-linking composition is present in said treating fluid in an amount of from about 0.05% to about 0.8% by weight of said water in said treating fluid.

15. The method of claim 1 wherein said viscosity stabilizing agent is present in said treating fluid in an amount of from go about 0.001% to about 1% by weight of said water.

16. The method of claim 1 wherein said viscosity stabilizing agent is formic acid.

17. An improved cross-linked aqueous well treating fluid comprising:

water;

guar present in said treating fluid in an amount of about 0.30% by weight of said water;

a borate ion releasing compound present in said treating fluid in an amount of about 0.2% by weight of said water; and formic acid present in said treating fluid in an amount of about 0.1% by weight of said water.

* * * * *